US 7,526,474 B2

(12) United States Patent
Ohkuma et al.

(10) Patent No.: US 7,526,474 B2
(45) Date of Patent: Apr. 28, 2009

(54) QUESTION ANSWERING SYSTEM, DATA SEARCH METHOD, AND COMPUTER PROGRAM

(75) Inventors: Tomoko Ohkuma, Kanagawa (JP); Hiroshi Masuichi, Kanagawa (JP); Hiroki Yoshimura, Kanagawa (JP); Daigo Sugihara, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 335 days.

(21) Appl. No.: 11/232,379

(22) Filed: Sep. 22, 2005

(65) Prior Publication Data
US 2006/0206481 A1    Sep. 14, 2006

(30) Foreign Application Priority Data
Mar. 14, 2005    (JP)    ............................. 2005-070542

(51) Int. Cl.
*G06F 17/30*    (2006.01)
(52) U.S. Cl. ...................... 707/3; 707/7; 707/8; 707/9; 707/10
(58) Field of Classification Search ............... 707/1–10, 707/100–104.1, 200–206
See application file for complete search history.

(56) References Cited
U.S. PATENT DOCUMENTS

2003/0158723 A1    8/2003    Masuichi et al.
2005/0114327 A1*   5/2005    Kumamoto et al. ............ 707/3

FOREIGN PATENT DOCUMENTS

JP    A 2002-132811    5/2002

OTHER PUBLICATIONS

U.S. Appl. No. 11/231,947, filed Sep. 22, 2005, Masuichi et al.
U.S. Appl. No. 11/231,845, filed Sep. 22, 2005, Masuichi et al.
Lin et al; "Question Answering Techniques for the World Wide Web"; MIT Artificial Intelligence Laboratory; Tutorial Presentation of The 11th Conference on Computational Linguistics (EACL-2003); Apr. 12, 2003.
Katz et al; "Omnibase: Uniform Access to Heterogeneous Data for Question Answering"; Artificial Intelligence Laboratory; 2002; pp. 1-5.

(Continued)

*Primary Examiner*—Isaac M Woo
(74) *Attorney, Agent, or Firm*—Oliff & Berridge, PLC

(57) ABSTRACT

A question answering system includes a question-sentence analysis unit, a search unit, an answer-candidate extraction unit, a check-expression generation unit, a check-expression search unit and an answer-candidate correction unit. The question-sentence analysis unit extracts a keyword applied to a search process from an input question sentence. The search unit executes the search process with using the extracted keyword. The answer-candidate extraction unit extracts answer candidates for the input question sentence based on a search result. The check-expression generation unit analyzes the input question sentence to generate a check expression concatenating an analysis result and the extracted answer candidates. The check-expression search unit executes a search process based on the generated check expression. The answer-candidate correction unit selects an output answer to the input question from among answer the candidates based on a search result.

13 Claims, 19 Drawing Sheets

OTHER PUBLICATIONS

Masuichi et al; "Constructing a practical Japanese Parser based on Lexical Functional Grammar"; Lexical Functional Grammar; vol. 10, No. 2; Apr. 2003; pp. 79-109.

Masuichi et al; "Japanese Parser on the basis of the Lexical-Functional Grammar Formalism and its Evaluation"; The 17th Pacific Asia Conference on Language, Information and Computation (PACLIC17); Oct. 2003; pp. 298-309.

Kay; "Chart Generation"; 34th Annual Meeting of the Association for Computational Linguistics; Proceedings of the Conference; Jun. 1996; pp. 200-204.

* cited by examiner

FIG. 3

| RANKING | ANSWER CANDIDATES | SCORE |
|---------|-------------------|-------|
| 1 | GIRISHA (GREECE) | HIGH ↑ |
| 2 | ROMA (ROMA) | |
| 3 | AREKISANDORIA (ALEXANDRIA) | |
| 4 | ARABIA (ARABIA) | |
| 5 | EFESOSU (EPHESOS) | |
| 6 | AKUTHIUM (ACTIUM) | |
| 7 | EJIPUTO (EGYPT) | |
| 8 | FARAO (PHARAOH) | |
| 9 | ARUTEMISU-SHINDEN (ARTEMIS) | ↓ |
| 10 | KOBURA (COBRA) | LOW |

FIG. 6A $$\begin{pmatrix} \text{PRED OSAMERU (GOVERN) <SUBJ, OBJ>} \\ \text{SUBJ PRED KUREOPATORA (CLEOPATRA)} \\ \text{OBJ PRED ***} \end{pmatrix}$$

FIG. 6B (B1) $\begin{pmatrix} \text{PRED OSAMERU (GOVERN) <SUBJ, OBJ>} \\ \text{SUBJ PRED KUREOPATORA (CLEOPATRA)} \\ \text{OBJ PRED GIRISHA (GREECE)} \end{pmatrix}$ (B2) $\begin{pmatrix} \text{PRED OSAMERU (GOVERN) <SUBJ, OBJ>} \\ \text{SUBJ PRED KUREOPATORA (CLEOPATRA)} \\ \text{OBJ PRED ROMA (ROMA)} \end{pmatrix}$

⋮

(B7) $\begin{pmatrix} \text{PRED OSAMERU (GOVERN) <SUBJ, OBJ>} \\ \text{SUBJ PRED KUREOPATORA (CLEOPATRA)} \\ \text{OBJ PRED EJIPUTO (EGYPT)} \end{pmatrix}$

⋮

(B10) $\begin{pmatrix} \text{PRED OSAMERU (GOVERN) <SUBJ, OBJ>} \\ \text{SUBJ PRED KUREOPATORA (CLEOPATRA)} \\ \text{OBJ PRED KOBURA (COBRA)} \end{pmatrix}$

FIG. 7

| RANKING | ANSWER CANDIDATES | SCORE |
|---|---|---|
| 1 | GIRISHA (GREECE) | a. KUREOPATORA-WA GIRISYA-WO OSAMR-TA. (CLEOPATRA GOVERNED GREECE) |
| | | b. KUREOPATORA-GA OSAMER-TA GIRISYA. (GREECE WHICH CLEOPATRA GOVERNED) |
| 2 | ROMA (ROMA) | a. KUREOPATORA-WA ROMA-WO OSAMR-TA. (CLEOPATRA GOVERNED ROMA) |
| | | b. KUREOPATORA-GA OSAMER-TA ROMA. (ROMA WHICH CLEOPATRA GOVERNED) |
| 3 | AREKISANDORIA (ALEXANDRIA) | a. KUREOPATORA-WA AREKISANDORIA-WO OSAMR-TA. (CLEOPATRA GOVERNED ALEXANDRIA) |
| | | b. KUREOPATORA-GA OSAMER-TA AREKISANDORIA. (ALEXANDRIA WHICH CLEOPATRA GOVERNED) |
| 4 | ARABIA (ARABIA) | a. KUREOPATORA-WA ARABIA-WO OSAMR-TA. (CLEOPATRA GOVERNED ARABIA) |
| | | b. KUREOPATORA-GA OSAMER-TA ARABIA. (ARABIA WHICH CLEOPATRA GOVERNED) |
| 5 | EFESOSU (EPHESOS) | a. KUREOPATORA-WA EFESOSU-WO OSAMR-TA. (CLEOPATRA GOVERNED EPHESOS) |
| | | b. KUREOPATORA-GA OSAMER-TA EFESOSU. (EPHESOS WHICH CLEOPATRA GOVERNED) |

| RANKING | ANSWER CANDIDATES | SCORE |
|---|---|---|
| 6 | AKUTHIUMU (ACTIUM) | a. KUREOPATORA-WA AKUTHIUMU-WO OSAMR-TA. (CLEOPATRA GOVERNED ACTIUM) |
| | | b. KUREOPATORA-GA OSAMER-TA AKUTHIUMU. (ACTIUM WHICH CLEOPATRA GOVERNED) |
| 7 | EJIPUTO (EGYPT) | a. KUREOPATORA-WA EJIPUTO-WO OSAMR-TA. (CLEOPATRA GOVERNED EGYPT) |
| | | b. KUREOPATORA-GA OSAMER-TA EJIPUTO. (EGYPT WHICH CLEOPATRA GOVERNED) |
| 8 | FARAO (PHARAOH) | a. KUREOPATORA-WA FARAO-WO OSAMR-TA. (CLEOPATRA GOVERNED PHARAOH) |
| | | b. KUREOPATORA-GA OSAMER-TA FARAO. (PHARAOH WHICH CLEOPATRA GOVERNED) |
| 9 | ARUTEMISU-SHINDEN (ARTEMIS) | a. KUREOPATORA-WA ARUTEMISU-SHINDEN-WO OSAMR-TA. (CLEOPATRA GOVERNED ARTEMIS) |
| | | b. KUREOPATORA-GA OSAMER-TA ARUTEMISU-SHINDEN. (ARTEMIS WHICH CLEOPATRA GOVERNED) |
| 10 | KOBURA (COBRA) | a. KUREOPATORA-WA KOBURA-WO OSAMR-TA. (CLEOPATRA GOVERNED COBRA) |
| | | b. KUREOPATORA-GA OSAMER-TA KOBURA. (COBRA WHICH CLEOPATRA GOVERNED) |

FIG. 8

| RANKING | ANSWER CANDIDATES | SCORE | NUMBER OF HITS |
|---|---|---|---|
| 1 | GIRISHA (GREECE) | a. KUREOPATORA-WA GIRISYA-WO OSAMR-TA. (CLEOPATRA GOVERNED GREECE) <br> b. KUREOPATORA-GA OSAMER-TA GIRISYA. (GREECE WHICH CLEOPATRA GOVERNED) | 3 |
| 2 | ROMA (ROMA) | a. KUREOPATORA-WA ROMA-WO OSAMR-TA. (CLEOPATRA GOVERNED ROMA) <br> b. KUREOPATORA-GA OSAMER-TA ROMA. (ROMA WHICH CLEOPATRA GOVERNED) | 1 |
| 3 | AREKISANDORIA (ALEXANDRIA) | a. KUREOPATORA-WA AREKISANDORIA-WO OSAMR-TA. (CLEOPATRA GOVERNED ALEXANDRIA) <br> b. KUREOPATORA-GA OSAMER-TA AREKISANDORIA. (ALEXANDRIA WHICH CLEOPATRA GOVERNED) | 0 |
| 4 | ARABIA (ARABIA) | a. KUREOPATORA-WA ARABIA-WO OSAMR-TA. (CLEOPATRA GOVERNED ARABIA) <br> b. KUREOPATORA-GA OSAMER-TA ARABIA. (ARABIA WHICH CLEOPATRA GOVERNED) | 0 |
| 5 | EFESOSU (EPHESOS) | a. KUREOPATORA-WA EFESOSU-WO OSAMR-TA. (CLEOPATRA GOVERNED EPHESOS) <br> b. KUREOPATORA-GA OSAMER-TA EFESOSU. (EPHESOS WHICH CLEOPATRA GOVERNED) | 2 |

| RANKING | ANSWER CANDIDATES | SCORE | NUMBER OF HITS |
|---|---|---|---|
| 6 | AKUTHIUMU (ACTIUM) | a. KUREOPATORA-WA AKUTHIUMU-WO OSAMR-TA. (CLEOPATRA GOVERNED ACTIUM) | 0 |
| | | b. KUREOPATORA-GA OSAMER-TA AKUTHIUMU. (ACTIUM WHICH CLEOPATRA GOVERNED) | |
| 7 | EJIPUTO (EGYPT) | a. KUREOPATORA-WA EJIPUTO-WO OSAMR-TA. (CLEOPATRA GOVERNED EGYPT) | 21 |
| | | b. KUREOPATORA-GA OSAMER-TA EJIPUTO. (EGYPT WHICH CLEOPATRA GOVERNED) | |
| 8 | FARAO (PHARAOH) | a. KUREOPATORA-WA FARAO-WO OSAMR-TA. (CLEOPATRA GOVERNED PHARAOH) | 0 |
| | | b. KUREOPATORA-GA OSAMER-TA FARAO. (PHARAOH WHICH CLEOPATRA GOVERNED) | |
| 9 | ARUTEMISU-SHINDEN (ARTEMIS) | a. KUREOPATORA-WA ARUTEMISU-SHINDEN-WO OSAMR-TA. (CLEOPATRA GOVERNED ARTEMIS) | 0 |
| | | b. KUREOPATORA-GA OSAMER-TA ARUTEMISU-SHINDEN. (ARTEMIS WHICH CLEOPATRA GOVERNED) | |
| 10 | KOBURA (COBRA) | a. KUREOPATORA-WA KOBURA-WO OSAMR-TA. (CLEOPATRA GOVERNED COBRA) | 0 |
| | | b. KUREOPATORA-GA OSAMER-TA KOBURA. (COBRA WHICH CLEOPATRA GOVERNED) | |

FIG. 13

| RANKING | ANSWER CANDIDATES | SCORE |
|---|---|---|
| 1 | GREECE | HIGH |
| 2 | ROMA | ↑ |
| 3 | ALEXANDRIA | |
| 4 | ARABIA | |
| 5 | EPHESOS | |
| 6 | ACTIUM | |
| 7 | EGYPT | |
| 8 | PHARAOH | |
| 9 | ARTEMIS | ↓ |
| 10 | COBRA | LOW |

FIG. 15A $$\begin{pmatrix} \text{PRED GOVERN <SUBJ, OBJ>} \\ \text{SUBJ PRED CLEOPATRA} \\ \text{OBJ PRED * * *} \end{pmatrix}$$

FIG. 15B (B1) $\begin{pmatrix} \text{PRED GOVERN <SUBJ, OBJ>} \\ \text{SUBJ PRED CLEOPATRA} \\ \text{OBJ PRED GREECE} \end{pmatrix}$ (B2) $\begin{pmatrix} \text{PRED GOVERN <SUBJ, OBJ>} \\ \text{SUBJ PRED CLEOPATRA} \\ \text{OBJ PRED ROMA} \end{pmatrix}$

⋮

(B7) $\begin{pmatrix} \text{PRED GOVERN <SUBJ, OBJ>} \\ \text{SUBJ PRED CLEOPATRA} \\ \text{OBJ PRED EGYPT} \end{pmatrix}$

⋮

(B10) $\begin{pmatrix} \text{PRED GOVERN <SUBJ, OBJ>} \\ \text{SUBJ PRED CLEOPATRA} \\ \text{OBJ PRED COBRA} \end{pmatrix}$

FIG. 16

| RANKING | ANSWER CANDIDATES | SCORE |
|---|---|---|
| 1 | GREECE | a. CLEOPATRA GOVERNED GREECE. |
| | | b. GREECE WHICH CLEOPATRA GOVERNED |
| 2 | ROMA | a. CLEOPATRA GOVERNED ROMA. |
| | | b. ROMA WHICH CLEOPATRA GOVERNED |
| 3 | ALEXANDRIA | a. CLEOPATRA GOVERNED ALEXANDRIA. |
| | | b. ALEXANDRIA WHICH CLEOPATRA GOVERNED |
| 4 | ARABIA | a. CLEOPATRA GOVERNED ARABIA. |
| | | b. ARABIA WHICH CLEOPATRA GOVERNED |
| 5 | EPHESOS | a. CLEOPATRA GOVERNED EPHESOS. |
| | | b. EPHESOS WHICH CLEOPATRA GOVERNED |
| 6 | ACTIUM | a. CLEOPATRA GOVERNED ACTIUM. |
| | | b. ACTIUM WHICH CLEOPATRA GOVERNED |
| 7 | EGYPT | a. CLEOPATRA GOVERNED EGYPT. |
| | | b. EGYPT WHICH CLEOPATRA GOVERNED |
| 8 | PHARAOH | a. CLEOPATRA GOVERNED PHARAOH. |
| | | b. PHARAOH WHICH CLEOPATRA GOVERNED |
| 9 | ARTEMIS | a. CLEOPATRA GOVERNED ARTEMIS. |
| | | b. ARTEMIS WHICH CLEOPATRA GOVERNED |
| 10 | COBRA | a. CLEOPATRA GOVERNED COBRA. |
| | | b. COBRA WHICH CLEOPATRA GOVERNED |

FIG. 17

| RANKING | ANSWER CANDIDATES | SCORE | NUMBER OF HITS |
|---|---|---|---|
| 1 | GREECE | a. CLEOPATRA GOVERNED GREECE. | 2 |
| | | b. GREECE WHICH CLEOPATRA GOVERNED | |
| 2 | ROMA | a. CLEOPATRA GOVERNED ROMA. | 1 |
| | | b. ROMA WHICH CLEOPATRA GOVERNED | |
| 3 | ALEXANDRIA | a. CLEOPATRA GOVERNED ALEXANDRIA. | 0 |
| | | b. ALEXANDRIA WHICH CLEOPATRA GOVERNED | |
| 4 | ARABIA | a. CLEOPATRA GOVERNED ARABIA. | 0 |
| | | b. ARABIA WHICH CLEOPATRA GOVERNED | |
| 5 | EPHESOS | a. CLEOPATRA GOVERNED EPHESOS. | 3 |
| | | b. EPHESOS WHICH CLEOPATRA GOVERNED | |
| 6 | ACTIUM | a. CLEOPATRA GOVERNED ACTIUM. | 0 |
| | | b. ACTIUM WHICH CLEOPATRA GOVERNED | |
| 7 | EGYPT | a. CLEOPATRA GOVERNED EGYPT. | 23 |
| | | b. EGYPT WHICH CLEOPATRA GOVERNED | |
| 8 | PHARAOH | a. CLEOPATRA GOVERNED PHARAOH. | 0 |
| | | b. PHARAOH WHICH CLEOPATRA GOVERNED | |
| 9 | ARTEMIS | a. CLEOPATRA GOVERNED ARTEMIS. | 0 |
| | | b. ARTEMIS WHICH CLEOPATRA GOVERNED | |
| 10 | COBRA | a. CLEOPATRA GOVERNED COBRA. | 0 |
| | | b. COBRA WHICH CLEOPATRA GOVERNED | |

QUESTION ANSWERING SYSTEM, DATA SEARCH METHOD, AND COMPUTER PROGRAM

BACKGROUND OF THE INVENTION

1. Field of the Invention

This invention relates to a question answering system, a data search method, and a computer program and more particularly to a question answering system, a data search method, and a computer program for making it possible to select and provide an appropriate answer by checking answer candidates using a check pattern in a system wherein the user enters a question sentence and an answer to the question is provided.

2. Description of the Related Art

Recently, network communications through the Internet, etc., have grown in use and various services have been provided through the network. One of the services through the network is search service. In the search service, for example, a search server receives a search request from a user terminal such as a personal computer or a mobile terminal connected to the network, executes a process responsive to the search request, and transmits the process result to the user terminal.

For example, to execute a search process through the Internet, the user accesses a Web site providing search service, enters search conditions such as a keyword, category, etc., in accordance with a menu presented by the Web site, and transmits the search conditions to a server. The server executes a process in accordance with the search conditions and displays the process result on the user terminal.

A data search process is implemented by various modes. For example, a keyword-based search system in which the user enters a keyword and list information of documents containing the entered keyword is presented to the user; a question answering system in which the user enters a question sentence and an answer to the question is provided; and the like are available. The question answering system is a system in which the user need not select a keyword and can receive only the answer to the question; it is widely used.

For example, JP 2002-132811 A discloses a typical question answering system. JP 2002-132811 A discloses a configuration for determining a search-word set and a question type from a question sentence, searching a document set stored in a document-set storage unit for a relevant-document set in accordance with the determined search-word set and the question type, extracting an answer to the question sentence from relevant documents, and providing the extracted answer and document information from which the answer is extracted as an answering result to the question sentence.

In a general question answering system, the question statement provided by the user is input and the answer to the question is output without outputting the whole hit document. Often, Web information is used as a knowledge source to obtain an answer. Under the present circumstances, however, it is difficult to say that the question answering system has sufficient answering accuracy, and the question answering system is less widespread than a general search system.

If a search is made using Web information of an enormous amount of data, the number of answer candidates acquired by making the search also is likely to increase. If a large number of such answer candidates contain the correct answer required by the user, the correct answer gets mixed with other erroneous answer candidates and it becomes difficult to select the correct answer; this is a problem.

SUMMARY OF THE INVENTION

The invention provides a question answering system, which providing an answer to a question from a user, a data search method, and a computer program for making it possible to efficiently select an appropriate answer from among answer candidates.

More particularly, the invention provides a question answering system, a data search method, and a computer program for making it possible to efficiently select an appropriate answer from among answer candidates and to provide the answer, by (a) checking each answer candidate for validity using check sentence patterns automatically generated by combining each answer candidate with a question sentence and (b) removing erroneous answer candidates from the answer candidates based on the check result.

According to a first aspect of the invention, a question answering system includes a question-sentence analysis unit, a search unit, an answer-candidate extraction unit, a check-expression generation unit, a check-expression search unit and an answer-candidate correction unit. The question-sentence analysis unit extracts a keyword to be applied to a search process from an input question sentence. The search unit executes the search process with using the extracted keyword. The answer-candidate extraction unit extracts answer candidates for the input question sentence based on a search result of the search unit. The check-expression generation unit analyzes the input question sentence to generate a check expression concatenating an analysis result of the check-expression generation unit and the answer candidates extracted by the answer-candidate extraction unit. The check-expression search unit executes a search process based on the check expression generated by the check-expression generation unit. The answer-candidate correction unit selects an output answer to the input question from among answer the candidates based on a search result of the check-expression search unit.

Further, according to a second aspect of the invention, a data search method includes: extracting a keyword to be applied to a first search process from an input question sentence; executing the first search process with using the extracted keyword; extracting answer candidates for the input question sentence based on a search result of the first search process; executing an analysis process of the input question sentence to generate a check expression concatenating an analysis result and the extracted answer candidates; executing a second search process based on the generated check expression; and selecting an output answer to the input question from among the answer candidates based on a search result of the second search process.

Further, according to a third aspect of the invention, a computer program is stored in a computer readable medium. The computer program causes a computer to execute a data search process including: extracting a keyword to be applied to a first search process from an input question sentence; executing the first search process with using the extracted keyword; extracting answer candidates for the input question sentence based on a search result of the first search process; executing an analysis process of the input question sentence to generate a check expression concatenating an analysis result and the extracted answer candidates; executing a second search process based on the generated check expression;

and selecting an output answer to the input question from among the answer candidates based on a search result of the second search process.

This computer program is a computer program that can be provided by a recording medium or a communication medium for providing the computer program for a computer system that can execute various program codes in a computer-readable format. Examples of the recording medium include a CD, an FD, and an MO. Examples of the communication medium include a network. Such a program is provided in the computer-readable format, to thereby realize a process responsive to the program in a computer system.

Another object of the invention, features of the invention, and advantages of the invention will be revealed in the detailed description based on embodiments of the invention and the accompanying drawings. The system in the specification is a logical set made up of a plurality of units (apparatus) and is not limited to a set of units (apparatus) housed in a single casing.

According to the above-described configuration, it is made possible to efficiently select the most appropriate answer with high accuracy from among a large number of answer candidates and to provide the answer.

BRIEF DESCRIPTION OF THE DRAWINGS

Embodiment of the invention will be described in detail based on the following figures, wherein:

FIG. 3 is a drawing to describe an example of an answer candidate list generated in the question answering system according to the embodiment of the invention;

FIG. 6 is a drawing to show a data example of assigning answer candidates to f-structure as the result of the syntactic and semantic analysis generated by performing syntactic and semantic analysis process;

FIG. 7 is a drawing to describe check expressions generated based on the data of assigning answer candidates to f-structure as the result of the syntactic and semantic analysis generated by performing syntactic and semantic analysis process;

FIG. 8 is a drawing to show a number-of-hits list resulting from making a search based on the check expressions;

FIG. 13 is a drawing to describe an example of an answer candidate list generated in the question answering system according to another embodiment of the invention;

FIG. 15 is a drawing to show a data example of assigning answer candidates to f-structure as the result of the syntactic and semantic analysis generated by performing syntactic and semantic analysis process;

FIG. 16 is a drawing to describe check expressions generated based on the data of assigning answer candidates to f-structure as the result of the syntactic and semantic analysis generated by performing syntactic and semantic analysis process; and FIG. 17 is a drawing to show a number-of-hits list resulting from making a search based on the check expressions.

DETAILED DESCRIPTION OF THE EMBODIMENTS OF THE INVENTION

A question answering system, a data search method, and a computer program according to an embodiment of the invention will be discussed in detail with reference to the accompanying drawings.

Figure 1:
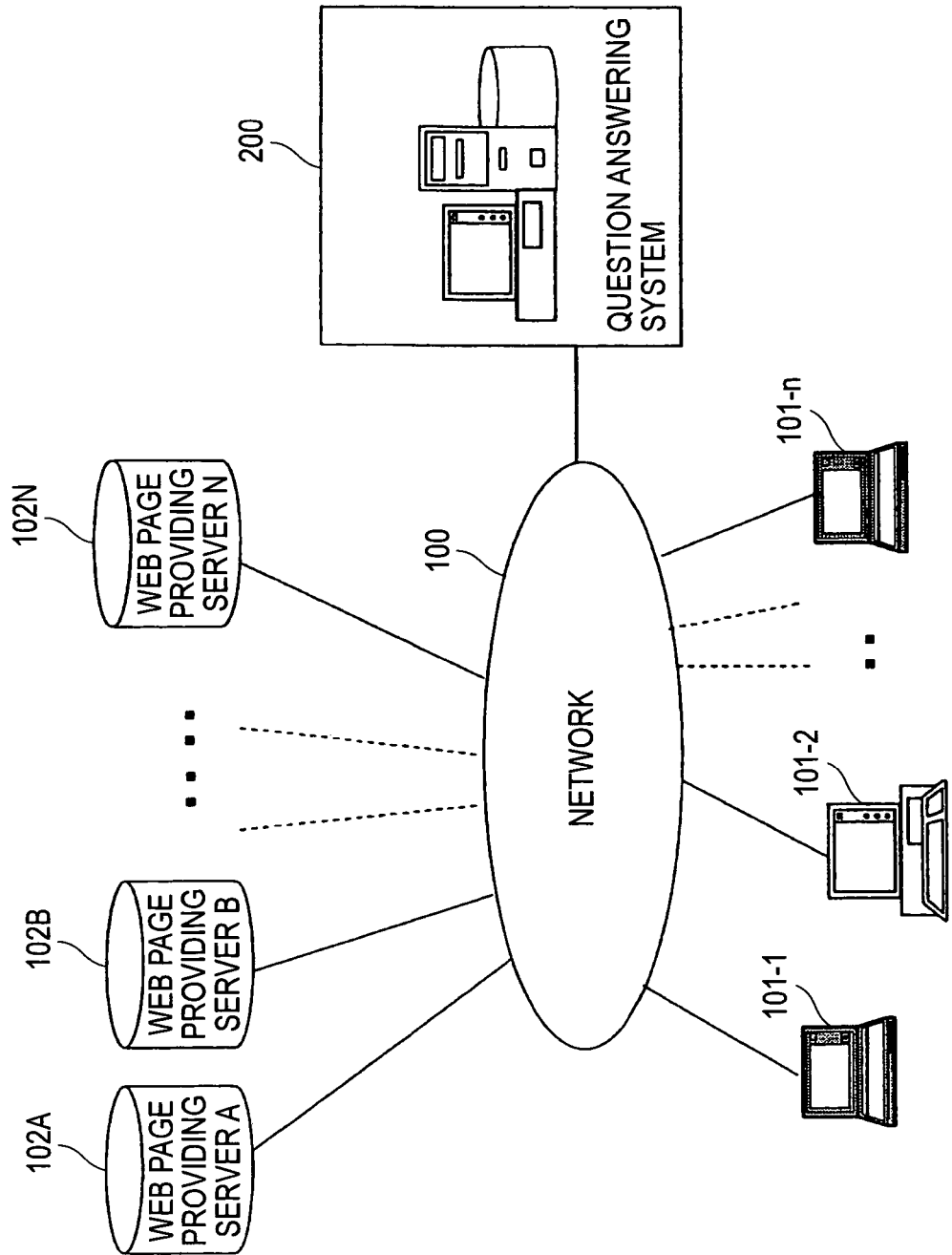
FIG. 1 is a drawing of the network configuration to show an application example of a question answering system of the invention.

To begin with, an example of the usage pattern of the question answering system of the embodiment of the invention will be discussed with reference to FIG. 1. FIG. 1 is a drawing showing the network configuration in which a question answering system 200 of the embodiment of the invention is connected to a network. A network 100 shown in FIG. 1 is, for example, the Internet, an intranet, etc. Connected to the network 100 are clients 101-1 to 101-*n* serving as user terminals for transmitting a question to the question answering system 200 and various Web-page providing servers 102A to 102N for providing Web pages serving as materials to acquire answers to the clients 101-1 to 101-*n*.

The question answering system 200 is input various question sentences generated by the users from the clients 101-1 to 101-*n* and provides the answers to the input questions for the clients 101-1 to 101-*n*. The answers to the questions are acquired from the Web pages provided by the Web-page providing servers 102A to 102N.

The Web-page providing servers 102A to 102N provide Web pages as pages opened to the public by a WWW (World Wide Web) system. The Web page is a data set to be displayed on a Web browser and is made up of text data, HTML layout information, an image, audio, a moving image, etc., embedded in a document. A set of Web pages is a Web site, which includes a top page (home page) and other Web pages linked from the top page.

The configuration of the question answering system 200 and a process executed by the question answering system 200 will be discussed with reference to FIG. 2. The question answering system 200 is connected to the network 100 and executes a process of receiving a question sentence from a client connected to the network 100, searching the Web pages provided by the Web page providing server connected to the network 100 as the information source for acquiring answer candidates, selecting an appropriate answer from among the acquired answer candidates, and providing the answer for the client.

Figure 2:
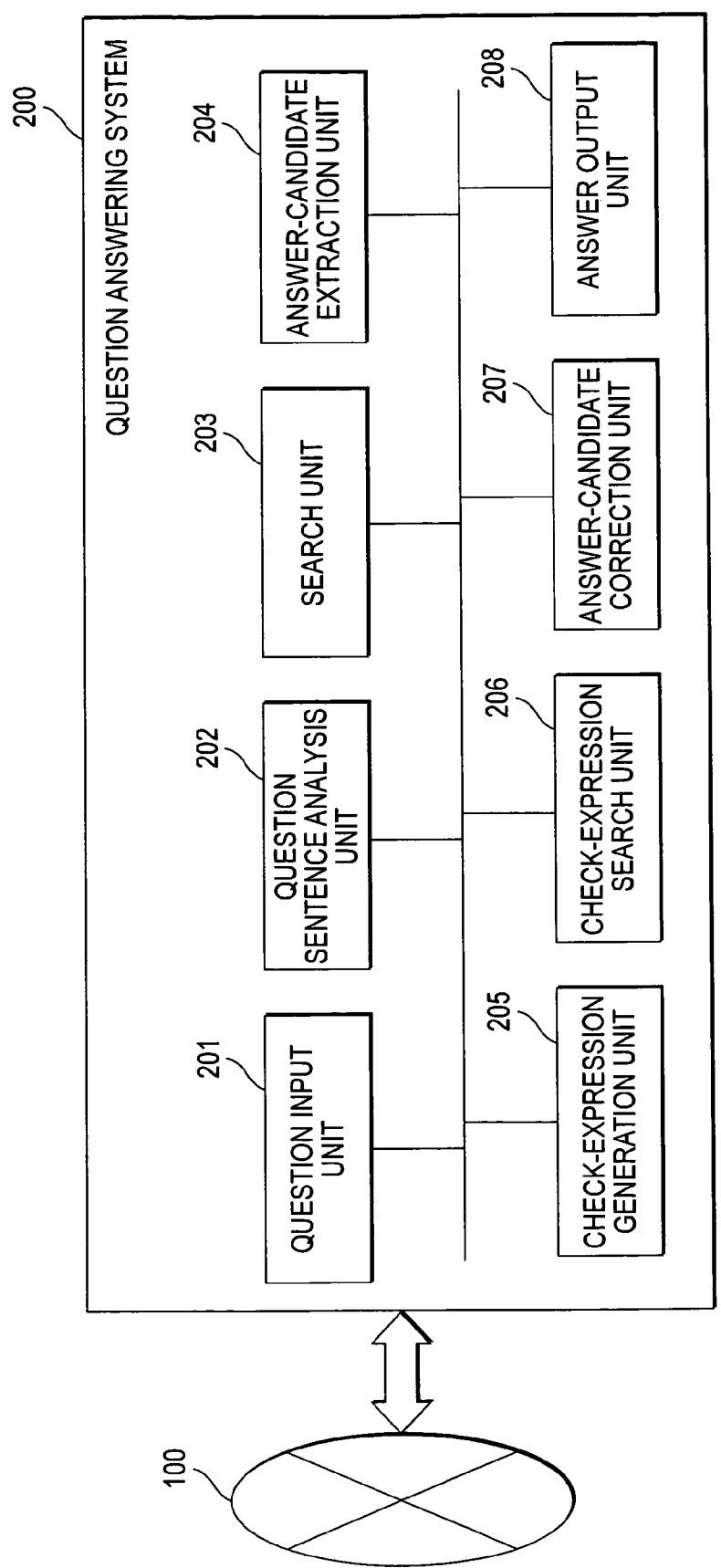
FIG. 2 is a block diagram to describe the configuration of the question answering system according to one embodiment of the invention.

The question answering system 200 has a question-sentence input unit 201, a question-sentence analysis unit 202, a search unit 203, an answer-candidate extraction unit 204, a check-expression generation unit 205, a check-expression search unit 206, an answer-candidate correction unit 207, and an answer output unit 208, as shown in FIG. 2. A process executed by each unit in the question answering system 200 will be discussed blow.

[Question-Sentence Input Unit]

The question-sentence input unit 201 is input to a question sentence (input question) from a client through the network 100. The process executed by each unit in the question answering system 200 will be discussed by assuming that a question of (input question) "Kenryoku-wo motsu-ta Kuleopatora-wa doko-wo osamer-te ir-mas-ta-ka?" (This question is written in Japanese using Roman characters. It means "what country did Cleopatra having power govern.") is input from a client as a specific question example.

[Question-Sentence Analysis Unit]

The question-sentence analysis unit 202 executes a analysis process of an input question and extracts a keyword to be applied to the search from the question statement. For example, a known important word extraction technique is applied to the keyword extraction process. Specifically, the TF/IDF value is used to calculate the score of each component word of the question sentence, and a keyword is extracted.

TF/IDF is a word evaluation process based on term frequency [TF] and inverse document frequency [IDF]. The term frequency [TF] is the term frequency [TF] of each word [A] and the inverse document frequency [IDF] is, for example, a value obtained as $$IDF = \log(N/f)$$

where
N: Number of all documents
f: Number of contents containing word [A]

That is, the inverse document frequency [IDF] is calculated as the value based on the inverse of the appearance ratio of the number of contents containing particular word to the number of all contents. This value is calculated based on a concept that if the number of contents containing particular word is small relative to the number of all contents, the value of the contents containing particular word is high.

For example, the question-sentence analysis unit 202 calculates the term frequency [TF] and the inverse document frequency [IDF] for each of the words making up the question sentence, calculates the score of each word by assuming that word score=TF×IDF, for example, and selects the word having the score equal to or greater than a predetermined threshold value as a keyword to be applied to the search.

The question-sentence analysis unit 202 uses the TF/IDF value to extract a keyword from the input question, for example. The question-sentence analysis unit 202 may execute the keyword extraction process incorporating any other method.

If the question
(input question)
Kenryoku-wo motsu-ta Kureopatora-wa doko-wo osameru-te-iru-masu-ta-ka?
Power+OBJ Have+PAST Cleopatra+SUBJ where+OBJ govern+prog+past+POLITE+int?
What country did Cleopatra having power govern?

is input from a client as a specific question example, it is assumed that the question-sentence analysis unit 202 extracts
"Kenryoku (power),"
"Kureopatora (Cleopatra)," and
"osameru (govern)"

as search keywords, for example. Hereinafter, Japanese sentences may be written in a format consisting of three rows, that is, in the first row, a sentence is written in Japanese using Roman characters; in the second row, English words into which the Japanese sentence is translated word by word are shown with attached to grammatical roles; and in the third row, an English translation of the Japanese sentence is shown (see the above input question). Also, Japanese words may be written using Roman characters and followed by English translations thereof (see the above extracted search keywords). OBJ is abbreviation of object, SUBJ is abbreviation of subject, PAST is abbreviation of past tense, PROG is abbreviation of progressive form, POLITE stands for polite form, INT is abbreviation of interrogative pronoun.

[Search Unit]

The search unit 203 executes a search process of applying the keywords, which is selected by the question-sentence analysis unit 202 through the analysis of the question sentence. A search expression is generated based on the TF/IDF value of each keyword, for example. As the simplest search expression, for example, a search expression concatenating the keywords by AND such as
Kenryoku (power) AND Kureopatora (Cleopatra) AND osameru (govern)

is applied.

The search unit 203 executes a search process based on such a search expression. For example, the search unit 203 executes the search process using the Web pages provided by the Web page providing server connected to the network 100 as the information source for acquiring the documents containing the keywords.

[Answer-Candidate Extraction Unit]

The answer-candidate extraction unit 204 extracts answer candidates from a search result of the search unit 203. The search result contains documents containing the above-described keywords, namely, "kenryoku (power)," "Kureopatora (Cleopatra)," and "osameru (govern)". The answer-candidate extraction unit 204 extracts the answer candidates from those documents. A known proper noun extraction technique can be applied to the answer-candidate extraction process. For example, proper nouns registered in a proper noun dictionary are acquired from documents. The proper noun dictionary may be a dictionary included in the question answering system 200 or may be a dictionary that can be accessed through the network.

Further, the answer candidates are ranked. In the ranking process, based on the conformity with the question type, for example, "person" is a highly reliable answer to a question of "who" and a high score is set. A high score is set for an answer of "place name" to a question of "where." Thus, the score of the proper noun having conformity with the question type is set high. If the appearance frequency is high, the score is set high. For example, score calculation using the TF/IDF value previously described may be performed. That is, a score based on the term frequency [TF] and the inverse document frequency [IDF] is calculated for each of the proper nouns acquired from the documents of the search result. An answer candidate list of the words in the descending order of the score is generated based on the scores of the answer candidates.

In this example, the input question is
(input question)
Kenryoku-wo motsu-ta Kureopatora-wa doko-wo osameru-te-iru-masu-ta-ka?
Power+OBJ Have+PAST Cleopatra+SUBJ where+OBJ govern+prog+past+POLITE+int?
What country did Cleopatra having power govern?

The adequate category as the answer to the question is a proper noun belonging to the category of place. Therefore, the score of the answer candidate as a proper noun belonging to the category of place is set high.

In the example, an answer candidate list, for example, shown in FIG. 3 is generated. As shown in FIG. 3, as the answer candidates extracted from the documents retrieved by performing the search process, an answer candidate list is generated in which 1. Girisya (Greece)
2. Roma (Roma)
3. Arekisandoria (Alexandria)
4. Arabia (Arabia)
5. Efesosu (Ephesos)
7. Ejiputo (Egypt)
8. Farao (Pharaoh)
9. Arutemisu-shinden (Artemis)
10. Kobura (Cobra)

in the descending order of the score. To determine the number of answer candidates set in the list, a restriction is put on the number in such a manner that the number is equal to a predetermined number or that only answer candidates having the score equal to or greater than a predetermined threshold value are set in the list.

[Check-Expression Generation Unit]

The check-expression generation unit 205 is input to a question sentence from the question-sentence input unit 201 and executes a syntactic and semantic analysis process of the question sentence. First, the syntactic and semantic analysis process will be discussed. Natural languages described in various languages including Japanese and English essentially have abstract and highly ambiguous nature, but can be subjected to computer process as sentences are handled mathematically. Consequently, various applications and services concerning natural languages can be provided by automation process, such as machine translation, an interactive system, a search system, and a question answering system. The natural language process generally is divided into process phases of morphological analysis, syntactic analysis, semantic analysis, and context analysis.

In the morphological analysis, a sentence is divided into morphemes of minimal meaning units and a process of identifying part of speech is performed. In the syntactic analysis, a sentence structure such as a phrase structure is analyzed based on the grammar laws. Since the grammar laws are of a tree structure, the syntactic analysis result generally becomes a tree structure where the morphemes are joined based on the modification relation. In the semantic analysis, obtained is a semantic structure representing the meaning of a sentence on the basis of the meaning of the words in the sentence (notion), the semantic relation between the words, etc, to synthesize a semantic structure. In the context analysis, text of a series of sentences (discourse) is assumed to be the basic unit of analysis, the semantic (meaningful) unit between the sentences is obtained, and a discourse structure is formed.

It is said that the syntactic analysis and the semantic analysis are absolutely necessary arts to realize applications of an interactive system, machine translation, document proofreading support, document abstract, etc., in the field of natural language process.

In the syntactic analysis, a natural language sentence is received and a process of determining the modification relation between the words (segments) is performed based on the grammar laws. The syntactic analysis result can be represented in the form of a true structure called dependency structure (dependency tree). In the semantic analysis, a process of determining the case relation in a sentence can be performed based on the modification relation between the words (segments). The expression "case relation" mentioned here refers to the grammar role such as subject (SUBJ) or object (OBJ) that each of the elements making up a sentence has. The semantic analysis may contain a process of determining the sentence tense, aspect, narration, etc.

As an example of a syntactic and semantic analysis system, it is possible to apply a natural language process system based on LFG described in detail in "Developing practical Japanese analyzing system based on Lexical Functional Grammar" (Masuichi and Ohkuma, natural language processing, Vol. 10. No. 2, pp. 79-109 (2003)).

Figure 4:
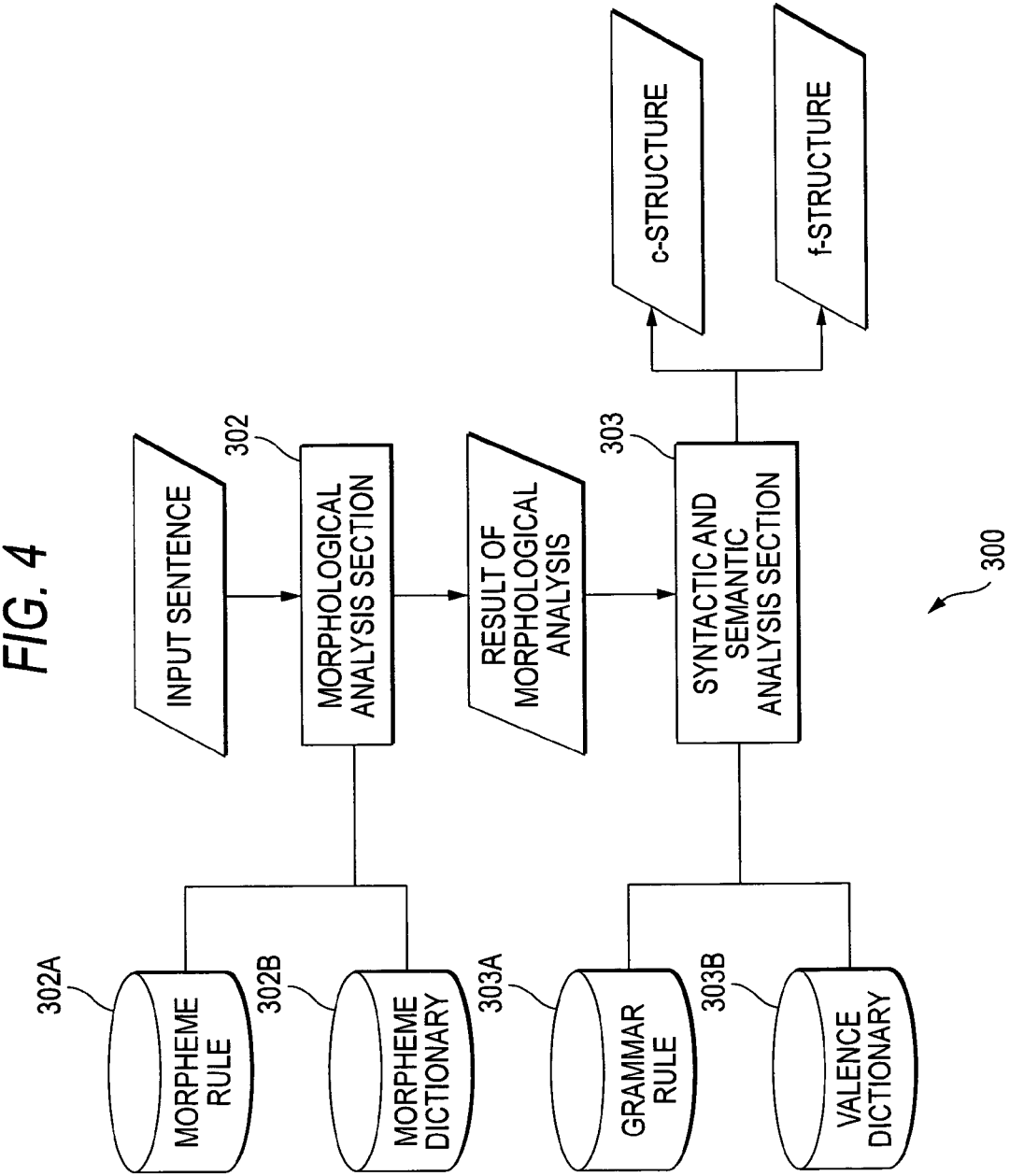
FIG. 4 is a diagram to describe a configuration example of a syntactic and semantic analysis system implementing check-expression generation unit in the question answering system according to the embodiment of the invention.

FIG. 4 shows the configuration of a natural language process system 300 based on Lexical Functional Grammar (LFG). A morphological analysis section 302 has a morpheme rule 302A and a morpheme dictionary 302B relating to a specific language such as Japanese. The morphological analysis section 302 divides an input sentence into morphemes of minimal meaning units and performs the process of identifying part of speech.

Then, the morphological analysis result is input to a syntactic and semantic analysis section 303. The syntactic and semantic analysis section 303 has dictionaries such as a grammar rule 303A and a valence dictionary 303B. The syntactic and semantic analysis section 303 analyzes the phrase structure based on the grammar rule, etc., and analyzes the semantic structure representing the meaning of a sentence based on the meaning of the words in the sentence, the semantic relation between the words, etc., (the valence dictionary describes the relation with any other component in the sentence such as a verb and a subject, and the semantic relation between a predicate and its dependent word can be extracted). Then, the syntactic and semantic analysis section 303 outputs "c-structure (constituent structure)" representing the phrase structure of the sentence made up of words, morphemes, etc., as a tree structure as the syntactic analysis result. Also, the syntactic and semantic analysis section 303 outputs "f-structure (functional structure)" as a result of semantically and functionally analyzing the input sentence as an interrogative sentence, past form, a polite sentence, etc., based on the case structure of a subject, an object, etc.

That is, c-structure represents the structure of a natural language sentence as a tree structure by collecting the morphemes of the sentence into an upper phrase, and f-structure represents semantic information of the case structure, sentence tense, aspect, narration, etc., of a sentence as an attribute-value matrix structure based on the notion of the grammar function.

In the example, the input question from the client is (input question)

Kenryoku-wo motsu-ta Kureopatora-wa doko-wo osameru-te-iru-masu-ta-ka?

Power+OBJ Have+PAST Cleopatra+SUBJ where+OBJ govern+prog+past+POLITE+int?

What country did Cleopatra having power govern?

Figure 5:
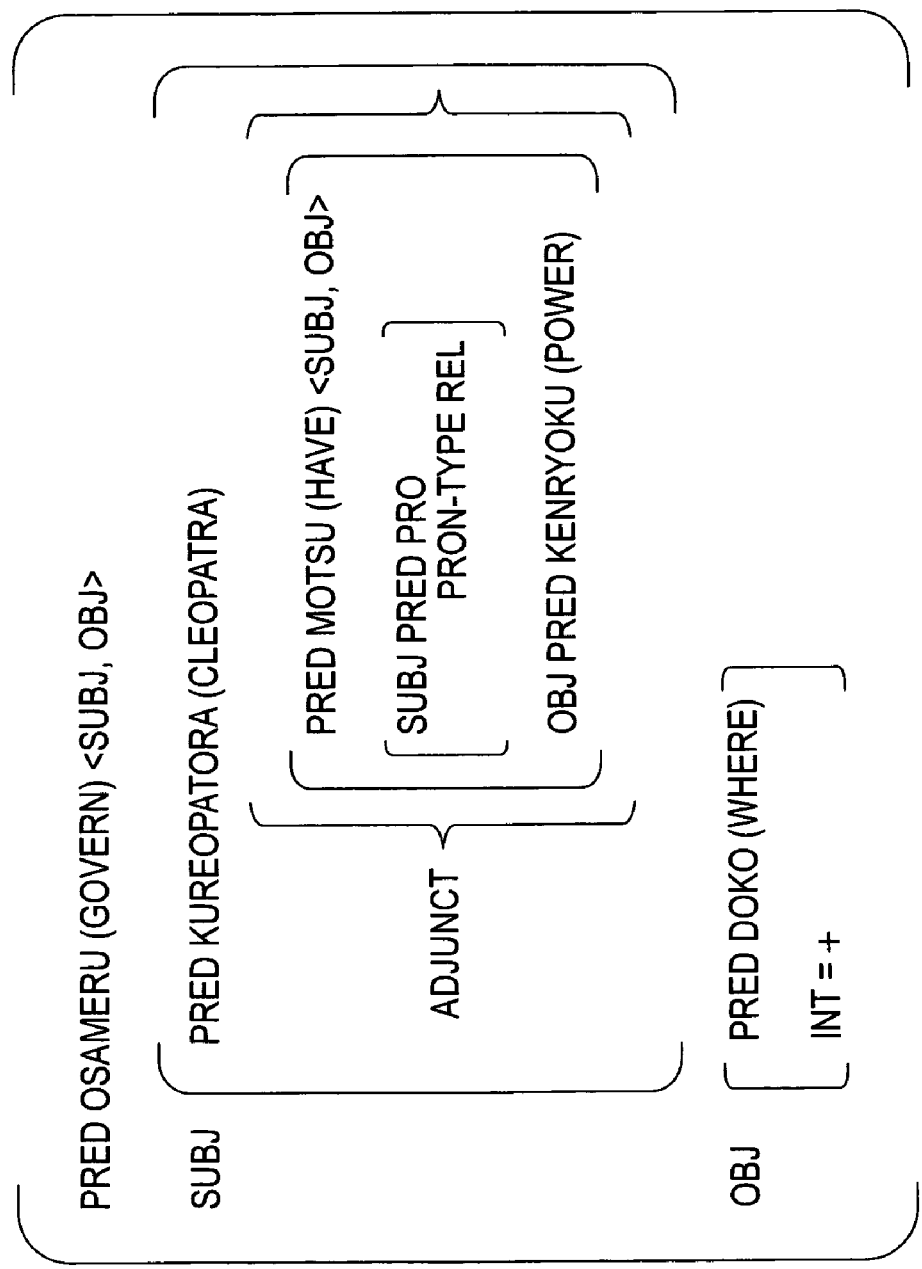
FIG. 5 is a drawing to show a data example of f-structure as the result of the syntactic and semantic analysis generated by performing syntactic and semantic analysis process.

FIG. 5 shows f-structure as the result of the syntactic and semantic analysis of the question sentence. The f-structure represents the grammar function clearly and is made up of grammar function name, semantic format, and feature symbol. By referring to f-structure, semantic understanding of subject, object, complement, adjunct, etc., can be obtained. The f-structure is a set of features attached to the nodes of c-structure shown as a tree structure, and is represented in the form of a matrix of attribute-value as shown in FIG. 5. That is, the left of the entries enclosed in [ ] is the name of the feature (attribute) and the right is the value of the feature (value).

The f-structure as the result of the syntactic and semantic analysis of (input question)

Kenryoku-wo motsu-ta Kureopatora-wa doko-wo osameru-te-iru-masu-ta-ka?

Power+OBJ Have+PAST Cleopatra+SUBJ where+OBJ govern+prog+past+POLITE+int?

What country did Cleopatra having power govern?

is shown in FIG. 5.

The f-structure shown in FIG. 5 is the analysis result of the question sentence and has a complicated construction. The check-expression generation unit 205 simplifies the f-structure having the complicated construction and generates simplified f-structure to be applied to check. FIG. 6A shows the construction of the simplified f-structure. The simplified f-structure is generated by deleting the modification element (adjunct. mod) from the f-structure corresponding to the input question shown in FIG. 5.

Further, the check-expression generation unit 205 generates f-structure in which the answer candidates are set subsequently in the set position of the answer equivalent word corresponding to the input question, that is, the set position of "what country" of "What country did Cleopatra having power govern?", from the top to the bottom of the answer candidate list previously generated by the answer-candidate extraction unit 204. Specifically, the check-expression generation unit 205 generates f-structure in which the answer candidates are set subsequently in the position of [OBJ PRED] of the simplified f-structure shown in FIG. 6A. The generated f-structures are shown in FIG. 6B.

The answer candidate list generated by the answer-candidate extraction unit 204 provides 2. Roma (Roma)
3. Arekisandoria (Alexandria)
4. Arabia (Arabia)
5. Efesosu (Ephesos)
6. Akuthiumu (Actium)
7. Ejiputo (Egypt)
8. Farao (Pharaoh)
9. Arutemisu-shinden (Artemis)
10. Kobura (Cobra)

in the descending order of the score, as previously described with reference to FIG. 4. The check-expression generation unit 205 first generates f-structure with [Japan] set in the position of [OBJ PRED] of the simplified f-structure, namely, f-structure shown in (B1) of FIG. 6B.

The check-expression generation unit 205 generates a check expression based on the f-structure shown in (B1) of FIG. 6B. While f-structure can be generated by executing syntactic and semantic analysis of a sentence as described above, a sentence can also be generated from f-structure. A sentence generation process from f-structure of the analysis result of LFG is detailed in "Chart Generation," (Kay, In proceedings of the 34th Annual Meeting of the ACL).

For example, if a sentence is generated from the f-structure shown in (B1) of FIG. 6, the following two sentences are obtained:

a.
kureopatora-wa Girisya-wo osamr-ta
Cleopatra+SUBJ Greece+OBJ Govern+PAST
Cleopatra governed Greece
b.
Kureopatora-ga osamer-ta Girisya
Cleopatra+SUBJ goven+PAST Greece
Greece which Cleopatra governed The check-expression generation unit 205 generates f-structure in which the answer candidates are set subsequently in the position of [OBJ PRED] of the simplified f-structure shown in FIG. 6A, from the top to the bottom of the answer candidate list previously generated by the answer-candidate extraction unit 204, that is, generates f-structures shown in (B1) to (B10) in FIG. 6B. Then, the check-expression generation unit 205 generates a check expression from each of the f-structures. Specifically, check expressions as shown in FIG. 7 are generated.

[Check-Expression Search Unit]

The check-expression search unit 206 applies the check expressions generated by the check-expression generation unit 205 in order to execute a search process. First, the check-expression search unit 206 executes the search process based on the following two sentences (check expressions) generated from the f-structure shown in (B1) of FIG. 6B:

a.
kureopatora-wa Girisya-wo osamr-ta
Cleopatra+SUBJ Greece+OBJ Govern+PAST
Cleopatra governed Greece
b.
Kureopatora-ga osamer-ta Girisya
Cleopatra+SUBJ goven+PAST Greece
Greece which Cleopatra governed The check-expression search unit 206 executes the search process based on these two check expressions. For example, the search process based on text pattern matching using the Web pages provided by the Web page providing server connected to the network as information sources is executed for acquiring documents.

Likewise, the check-expression search unit 206 executes the search process based on the check expressions corresponding to 2. Roma (Roma), 3. Arekisandoria (Alexandria), 4. Arabia (Arabia), 5. Efesosu (Ephesos), 6. Akuthiumu (Actium), 7. Ejiputo (Egypt), 8. Farao (Pharaoh), 9. Arutemisu-shinden (Artemis) and 10. Kobura (Cobra), in the descending order of the score in the answer candidate list generated by the answer-candidate extraction unit 204, and obtains the number of hits.

The number of text documents and other documents acquired by searching based on the check expressions, namely, the number of hits is obtained in association with each of the answer candidates in the answer candidate list. For example, it is assumed that a result shown in FIG. 8 is obtained.

[Answer-Candidate Correction Unit]

The answer-candidate correction unit 207 executes a narrowing process of the answer candidates based on the numbers of hits as the search result of the check-expression search unit 206 based on the check expressions, and selects the final answer to be presented to the client.

For example, a threshold value [n] is preset and only answer candidates with the number of hits>n are selected for the final answer to be presented to the client. For example, letting n equal 3, answer candidates with the number of hits>3 in the search result example shown in FIG. 8 are only [Ejiputo (Egypt)]. Therefore, [Egiputo (Egypt)] is selected as the final answer to be presented to the client.

[Answer Output Unit]

The answer output unit 208 outputs the answer selected by the answer-candidate correction unit 207 to the client. In the example, [Egiputo (Egypt)] with the number of hits>3 is provided for the client.

Figure 9:
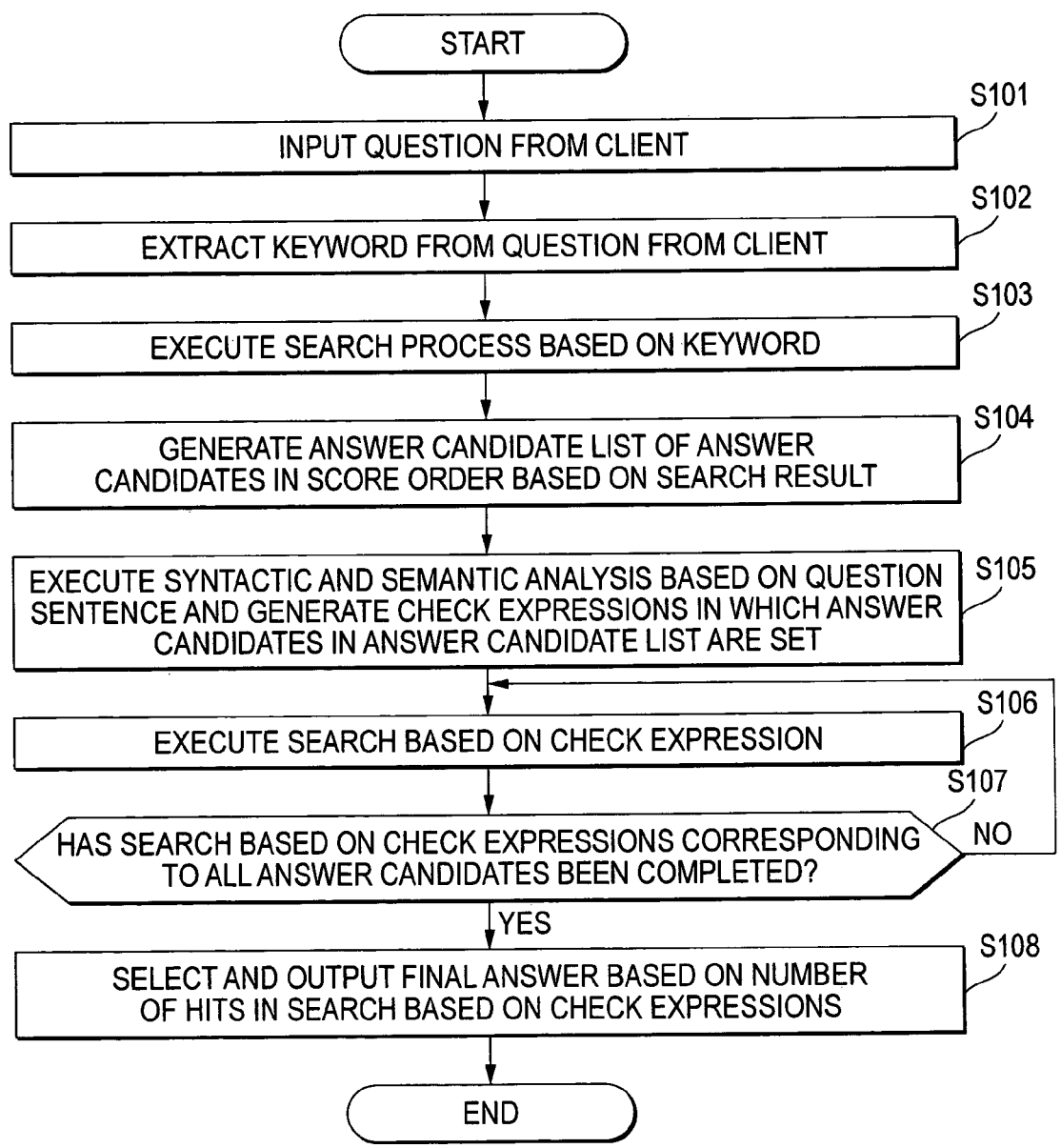
FIG. 9 is a flowchart to describe the process sequence executed by the question answering system according to the embodiment of the invention.

Next, the process sequence executed by the question answering system of this embodiment will be discussed with reference to FIG. 9.

When a question from a client is input at step S101, the analysis process of the input question from the client is executed and a keyword is extracted from the question sentence at step S102. The question-sentence analysis unit shown in FIG. 2 executes this process.

Specifically, for example, if the question (input question)

Kenryoku-wo motsu-ta Kureopatora-wa doko-wo osameru-te-iru-masu-ta-ka?

Power+OBJ Have+PAST Cleopatra+SUBJ where+OBJ govern+prog+past+POLITE+int?

What country did Cleopatra having power govern? is input from a client, "kenryoku (power)," "Kureopatora (Cleopatra)," and "osameru (govern)" are extracted as search keywords.

Next, at step S103, a search process based on the search keywords is executed. The search unit 203 shown in FIG. 2 executes this process. For example, the keyword search process for the Web pages provided by the Web page providing server connected to the network is executed for acquiring a plurality of answer candidates.

At step S104, the scores of the answer candidates are calculated and an answer candidate list of the answer candidates in the score order is generated. The answer-candidate extraction unit 204 shown in FIG. 2 executes this process. The answer candidate list shown in FIG. 3 is generated, for example.

The check-expression generation unit 205 executes a process at step S105. The syntactic and semantic analysis based on the question sentence is executed and check expressions are generated in which the answer candidates in the answer candidate list are set. For example, the check expressions shown in FIG. 7 are generated.

The check-expression search unit 206 shown in FIG. 2 executes a process at step S106. A search based on the check expressions generated at step S105 is executed. For example, a search process based on text pattern matching using the Web pages provided by the Web page providing server connected to the network as information sources is executed for acquiring documents.

At step S107, it is determined whether or not the search based on the check expressions corresponding to all answer candidates has been completed. If the search has not yet been completed, the process returns to step S106 and the search process based on the check expressions corresponding to another answer candidate is executed.

If it is determined at step S107 that the search based on the check expressions corresponding to all answer candidates has been completed, the process goes to step S108 and the final answer is selected for output based on the numbers of hits in the search using the check expressions. Te answer-candidate correction unit 207 and the answer output unit 208 shown in FIG. 2 execute this process.

The answer-candidate correction unit 207 executes a narrowing process of the answer candidates based on the numbers of hits as the search result of the check-expression search unit 206 based on the check expressions. Then, the answer-candidate correction unit 207 selects the final answer to be presented to the client. In the process example described above, the threshold value [n] is set to 3 and [Ejiputo(Egypt)] with the number of hits>3 in the search result example in FIG. 8 is finally presented to the client.

As a result of the process, for example, [Ejiputo (Egypt)] is finally selected and is provided for the client as the answer to (input question)

Kenryoku-wo motsu-ta Kureopatora-wa doko-wo osameru-te-iru-masu-ta-ka?

Power+OBJ Have+PAST Cleopatra+SUBJ where+OBJ govern+prog+past+POLITE+int?

What country did Cleopatra having power govern?

[Example of Applying a Result of Syntactic and Semantic Analysis as Data of Object to be Searched]

A different example from the above-described embodiment will be discussed.

In the description of the embodiment, the search based on the check expressions is executed as the search process based on text pattern matching using the Web pages provided by the Web page providing server connected to the network as the information source, for example, for acquiring documents. However, a search may be executed using data of the information source to be searched as the result of the syntactic and semantic analysis.

That is, in the process previously described, the check expressions in the question sentence format are generated based on f-structure generated from the question sentence. That is, f-structure (FIG. 5) corresponding to (input question)

Kenryoku-wo motsu-ta Kureopatora-wa doko-wo osameru-te-iru-masu-ta-ka?

Power+OBJ Have+PAST Cleopatra+SUBJ where+OBJ govern+prog+past+POLITE+int?

What country did Cleopatra having power govern? is generated and is simplified (FIG. 6A) and the check expressions in the question sentence format, namely, a.

kureopatora-wa Girisya-wo osamr-ta

Cleopatra+SUBJ Greece+OBJ Govern+PAST

Cleopatra governed Greece b.

Kureopatora-ga osamer-ta Girisya

Cleopatra+SUBJ goven+PAST Greece

Greece which Cleopatra governed are generated in sequence based on the simplified f-structure. The search is made based on the check expressions.

If the result of the syntactic and semantic analysis of the data of the information source to be searched, for example, f-structure corresponding to the data of the information source is retained, the f-structure set based on a question sentence and a plurality of answer candidates, namely, the f-structure shown in FIG. 6B is applied intact and it is made possible to acquire the result of the syntactic and semantic analysis corresponding to the text hit by executing a pattern matching between the results of the syntactic and semantic analysis, for example.

In this case, for example, data in an encyclopedia or at a specific Web site is previously acquired, a syntactic and semantic analysis process is executed thereon, a database retaining the result of the syntactic and semantic analysis is set, and a search is executed using the database as the information source.

For example, if the information source on which the syntactic and semantic analysis is executed contains two sentences a.

Kureopatora toiu namae-wa kodai girisya-go-de "titi no eikou" wo imisuru.

Cleopatra of namae+SUBJ old Greece-Language-in "father of glory"+OBJ mean.

Cleopatra means "father's glory" in an old Greece language.

b.

Kureopatora-wa titi-no-sigo oui-wo keisyousur-te ejiputo wo osamer-ta

Figure 10:
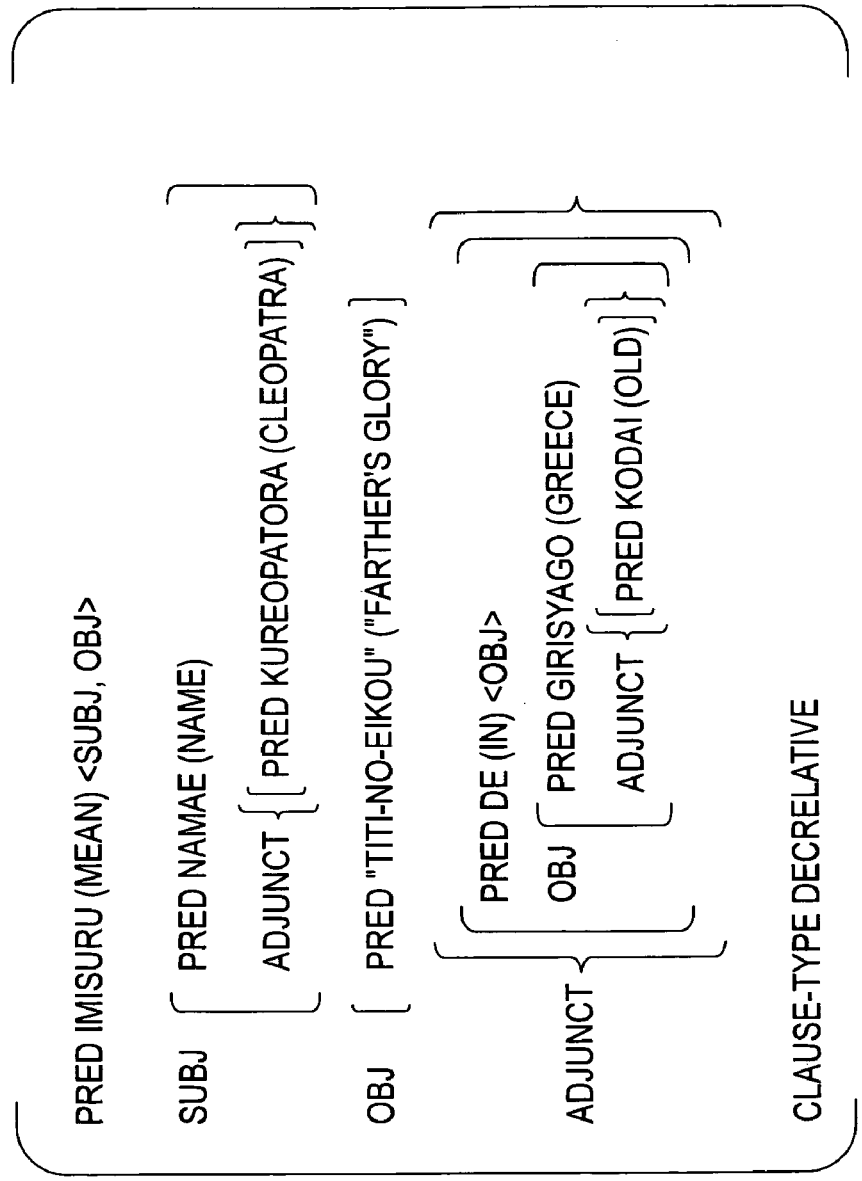
FIG. 10 is a drawing to show a data example of f-structure about data as information source.
Figure 11:
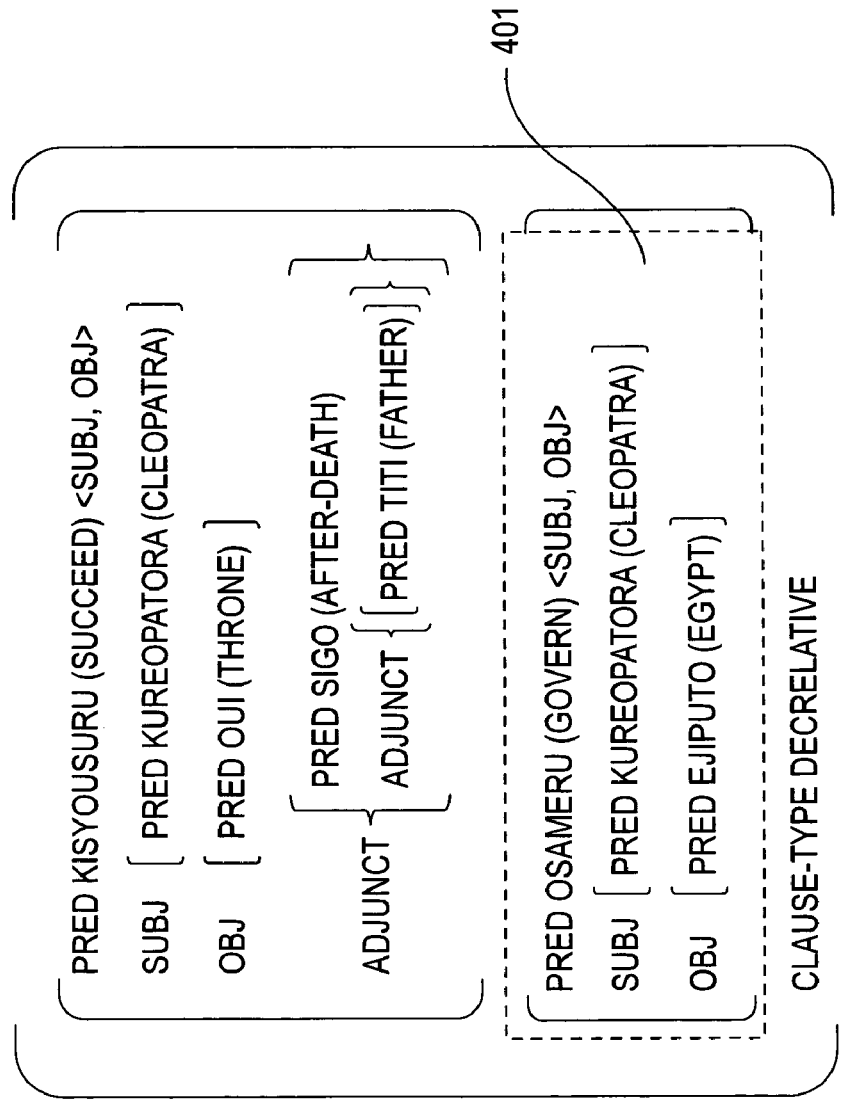
FIG. 11 is a drawing to show a data example of f-structure about data as information source.

Cleopatra+SUBJ father-of-death-after the-throne+OBJ succeed-and Egypt+OBJ govern Cleopatra succeeded the throne and governed Egypt after her father was died.

f-structures obtained from the results of the syntactic and semantic analysis have constructions shown in FIGS. 10 and 11, respectively.

The f-structure set based on the question sentence and answer candidates set in the embodiment described above, namely, the f-structure shown in FIG. 6B is applied to these f-structures, and the pattern matching between the results of the syntactic and semantic analysis is executed.

By executing this process, the f-structure setting [Ejiputo (Egypt)] in (B7) of FIG. 6B matches constituent components of the f-structure based on the text of the information source shown in FIG. 11, namely, a data section 401 in FIG. 11, and is extracted as hit information.

In the remaining process, the numbers of hits of the search result based on the f-structures corresponding to the respective answer candidates are compared, and the answer candidate having the larger number of hits than a threshold value is selected as the final answer as in the embodiment described above.

[Example in which an Input Question is Written in English]

In the above-described embodiment, the input question is written in Japanese. However, the invention is not limited thereto. The invention may be applied to a case where the input question is written in language other than Japanese. Here, another example in which an input question is written in English will be described with using the flowchart shown in FIG. 9.

When a question from a client is input at step S101, the analysis process of the input question from the client is executed and a keyword is extracted from the question sentence at step S102. The question-sentence analysis unit shown in FIG. 2 executes this process.

Specifically, for example, if the question (input question)

What country did Cleopatra having power govern?

is input from a client, "power," "Cleopatra," and "govern" are extracted as search keywords.

Next, at step S103, a search process based on the search keywords is executed. The search unit 203 shown in FIG. 2 executes this process. For example, the keyword search process for the Web pages provided by the Web page providing server connected to the network is executed for acquiring a plurality of answer candidates.

At step S104, the scores of the answer candidates are calculated and an answer candidate list of the answer candidates in the score order is generated. The answer-candidate extraction unit 204 shown in FIG. 2 executes this process. The answer candidate list shown in FIG. 13 is generated, for example.

The check-expression generation unit 205 executes a process at step S105. The syntactic and semantic analysis based on the question sentence is executed and check expressions are generated in which the answer candidates in the answer candidate list are set. The result of the syntactic and semantic analysis applied to the input question is shown in FIG. 13.

Figure 14:
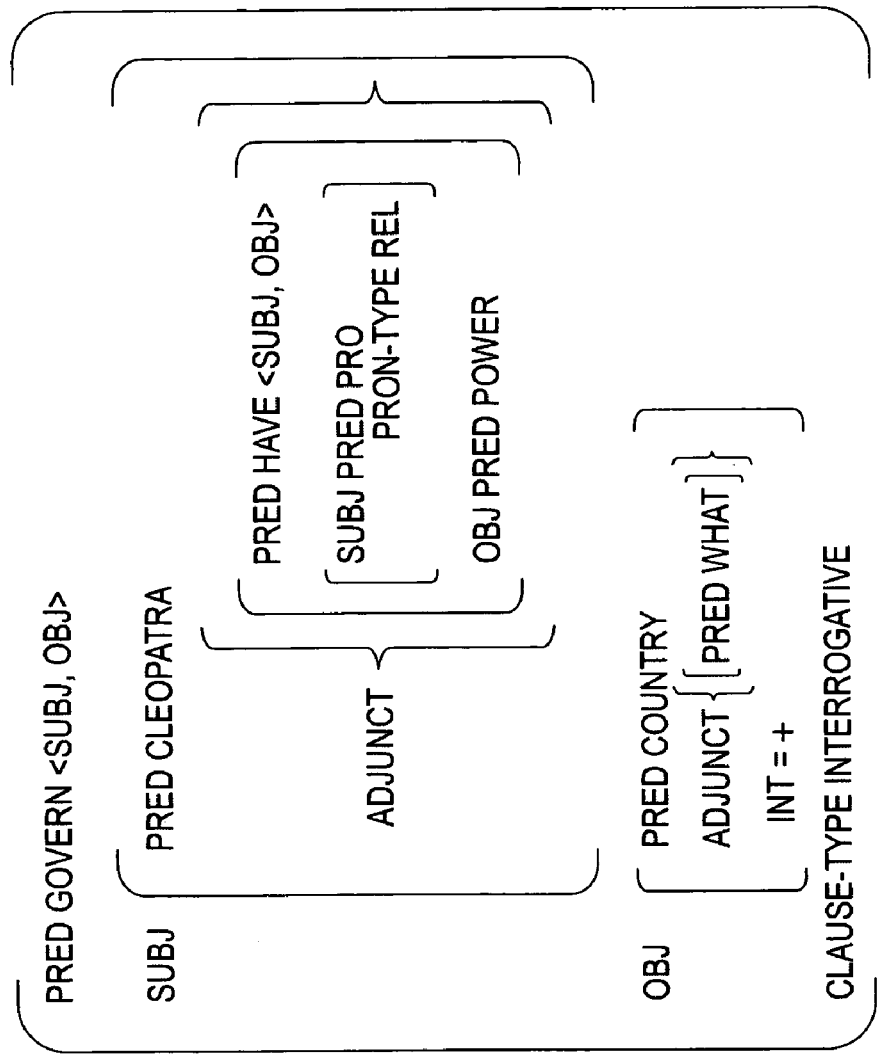
FIG. 14 is a drawing to show a data example of f-structure as the result of the syntactic and semantic analysis generated by performing syntactic and semantic analysis process.

The check-expression generation unit 205 simplifies the complex f-structure shown in FIG. 14 and outputs a simplified f-structure as shown in FIG. 15A. Specifically, the check-expression generation unit 205 deletes the modification element (adjunct. mod) from the complex f-structure corresponding to the input question shown in FIG. 5 to generate the simplified f-structure shown in FIG. 15A.

Further, the check-expression generation unit 205 generates f-structures in which the answer candidates are set subsequently in the set position of the answer equivalent word corresponding to the input question, that is, the set position of "what country" of "What country did Cleopatra having power govern?", from the top to the bottom of the answer candidate list previously generated by the answer-candidate extraction unit 204. Specifically, the check-expression generation unit 205 generates f-structures in which the answer candidates are set subsequently in the position of [OBJ PRED] of the simplified f-structure shown in FIG. 6A. The generated f-structures are shown in FIG. 15B.

As a result, the check-expression generation unit 205 generates check expressions shown in FIG. 16.

The check-expression search unit 206 shown in FIG. 2 executes a process at step S106. A search based on the check expressions generated at step S105 is executed. For example, a search process based on text pattern matching using the Web pages provided by the Web page providing server connected to the network as information sources is executed for acquiring documents.

At step S107, it is determined whether or not the search based on the check expressions corresponding to all answer candidates has been completed. If the search has not yet been completed, the process returns to step S106 and the search process based on the check expressions corresponding to another answer candidate is executed.

If it is determined at step S107 that the search based on the check expressions corresponding to all answer candidates has been completed, the process goes to step S108 and the final answer is selected for output based on the numbers of hits in the search using the check expressions. Te answer-candidate correction unit 207 and the answer output unit 208 shown in FIG. 2 execute this process.

The answer-candidate correction unit 207 executes a narrowing process of the answer candidates based on the numbers of hits as the search result of the check-expression search unit 206 based on the check expressions. Then, the answer-candidate correction unit 207 selects the final answer to be presented to the client. In the process example described above, the threshold value [n] is set to 3 and [Egypt]] with the number of hits>3 in the search result example in FIG. 17 is finally presented to the client.

As a result of the process, for example, [Egypt] is finally selected and is provided for the client as the answer to (input question)

What country did Cleopatra having power govern?

According to this configuration, it is made possible to make a search based on the result of the syntactic and semantic analysis of f-structure. Also, it is made possible to skip process of further generating a sentence from the result of the syntactic and semantic analysis.

Last, a hardware configuration example of an information process apparatus implementing the question answering system for executing the process described above will be discussed with reference to FIG. 12. A CPU (Central Process Unit) 501 executes process corresponding to an OS (Operating System) and executes the syntactic and semantic analysis process, the check expression generation process, the answer candidate list generation process, the answer candidate correction process, etc., based on an input question described above in the embodiment. The CPU 501 executes the process in accordance with a computer program stored in a data storage section of ROM, a hard disk, etc., of each information process apparatus.

ROM (Read-Only Memory) 502 stores the program, operation parameters, etc., used by the CPU 501. RAM (Random Access Memory) 503 stores a program used in execution of the CPU 501, parameters, etc., changed whenever necessary in the execution of the CPU 501. They are connected by a host bus 504 implemented as a CPU bus, etc.

The host bus 504 is connected to an external bus 506 of a PCI (Peripheral Component Interconnect/Interface) bus, etc., via a bridge 505.

A keyboard 508 and a pointing device 509 are input devices operated by the user. A display 510 is implemented as a liquid crystal display, a CRT (cathode ray tube), or the like for displaying various pieces of information as text or an image.

An HDD (Hard Disk Drive) 511 contains a hard disk and drives the hard disk for recording or reproducing (playing back) a program executed by the CPU 501 and information. The hard disk is used as proper noun dictionary storage means, answer candidate list storage means, etc., for example, and further stores various computer programs such as a data process program.

A drive 512 reads data or a program recorded on a removable recording medium 521 such as a magnetic disk, an optical disk, a magneto-optical disk, or semiconductor memory mounted, and supplies the data or the program to the RAM 503 connected via the interface 507, the external bus 506, the bridge 505, and the host bus 504.

A connection port 514 is a port for connecting an external connection machine 522 and has a connection section of USB, IEEE 1394, etc. The connection port 514 is connected to the CPU 501, etc., via the interface 507, the external bus 506, the bridge 505, the host bus 504, etc. A communication section 515 is connected to a network for executing communications with a client and a network connection server.

Figure 12:
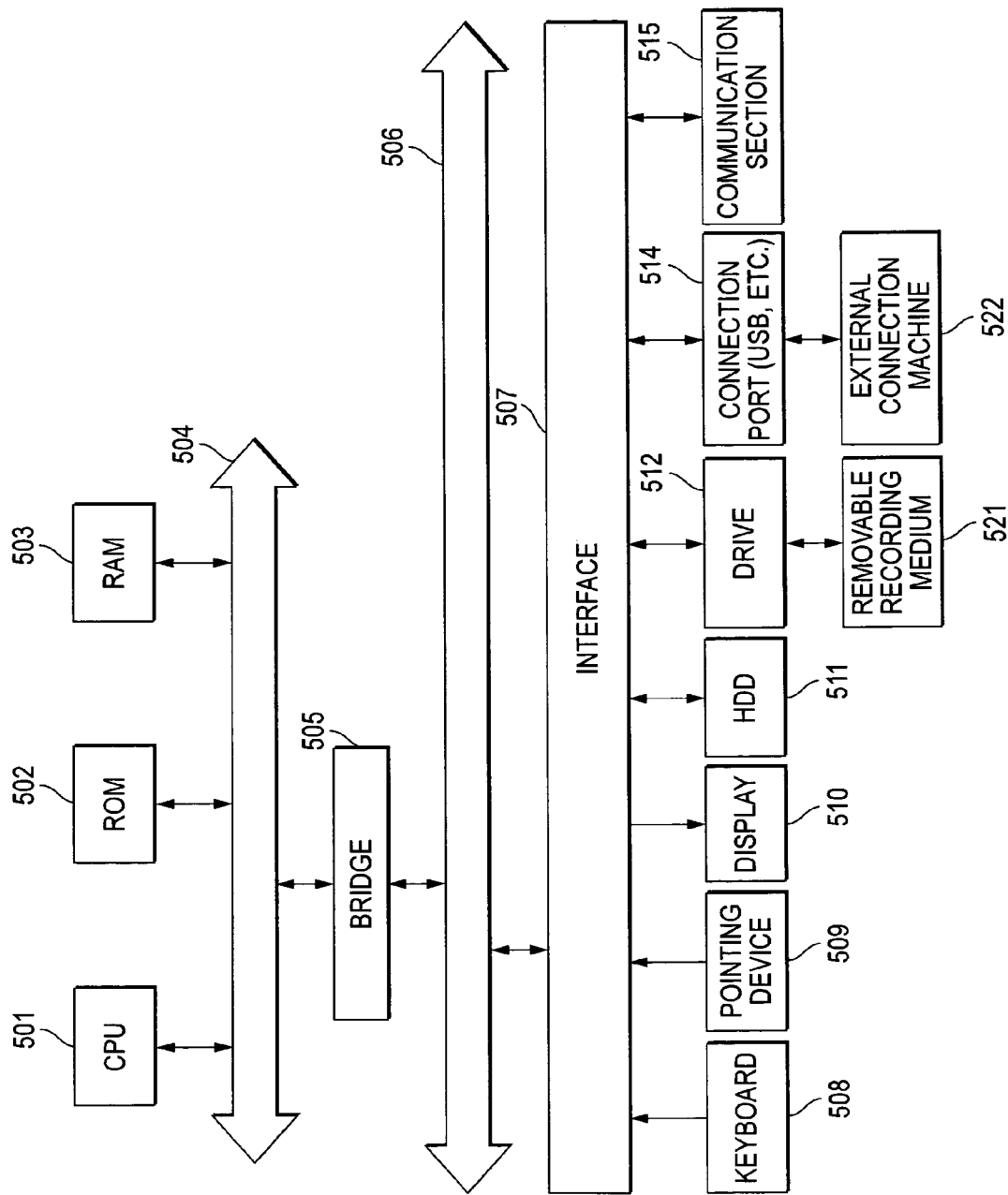
FIG. 12 is a diagram to describe a hardware configuration example of the question answering system according to the embodiment of the invention.

The hardware configuration example of the information process apparatus applied as the question answering system shown in FIG. 12 is an example of an apparatus incorporating a PC and the question answering system of the invention is not limited to the configuration shown in FIG. 12 and may have any configuration if the configuration has the capability of executing the process described above in the embodiment.

While the invention has been described in detail in its preferred embodiment, it is to be understood that modifications will be apparent to those skilled in the art without departing from the spirit and the scope of the invention. That is, the invention is disclosed for illustrative purposes only and it is to be understood that the invention is not limited to the specific embodiments thereof except as defined in the claims.

The process sequence described in the specification can be executed by both or either of hardware and software. To execute software process, the program recording the process sequence can be installed in memory in a computer incorporated in dedicated hardware for execution or can be installed in a general-purpose computer that can execute various types of process for execution.

For example, the program can be previously recorded on a hard disk or in ROM (Read-Only Memory) as a recording medium or can be stored (recorded) temporarily or permanently on a removable recording medium such as a flexible disk, a CD-ROM (Compact Disk Read-Only Memory), an MO (Magneto Optical) disk, a DVD (Digital Versatile Disk), a magnetic disk, or semiconductor memory. Such a removable recording medium can be provided as a package software product.

The program not only can be installed in a computer from a removable recording medium as described above, but also can be transferred by radio waves from a download site to a computer or can be transferred to a computer in a wired manner through a network such as the Internet for the computer to receive the program thus transferred and install the program on a recording medium such as a hard disk incorporated.

The various types of process described in the specification may be executed not only in time sequence according to the description, but also in parallel or individually in response to the process capability of the apparatus for executing the process or as required. The system in the specification is a logical set made up of a plurality of units (apparatus) and is not limited to a set of units (apparatus) housed in a single cabinet.

As described above, according to the configuration of the invention, a keyword applied to search process is extracted from an input question sentence; an answer candidate for the input question sentence is extracted based on the search result obtained by executing search process incorporating the keyword; a check expression concatenating the analysis result obtained by executing syntactic and semantic analysis process of the input question sentence and the answer candidate is generated, search process based on the generated check expression is executed; and an optimum answer to the question is selected based on the number of hits corresponding to each answer candidate based on the search result, so that it is made possible to efficiently select the most appropriate answer with high accuracy from among a large number of answer candidates and provide the answer.

What is claimed is:

1. A question answering system comprising:
  a processor;
  an input device for receiving an input question sentence;
  a question-sentence analysis unit controlled by the processor which is configured to extract a keyword to be applied to a search process from the input question sentence;
  a search unit controlled by the processor which is configured to execute the search process using the extracted keyword;
  an answer-candidate extraction unit controlled by the processor which is configured to extract answer candidates for the input question sentence based on a search result of the search unit;
  a check-expression generation unit controlled by the processor which is configured to analyze a structure of the input question sentence, an analysis result of the check-expression generation unit including at least detection of a subject of the input question sentence, and to generate a check expression in which (i) at least the subject of the input question sentence of the analysis result of the check-expression generation unit and (ii) each of the answer candidates extracted by the answer-candidate extraction unit are concatenated;
  a check-expression search unit controlled by the processor which is configured to execute a search process based on the check expression generated by the check-expression generation unit; and
  an answer-candidate correction unit controlled by the processor which is configured to select an output answer to the input question from among answer the candidates based on a search result of the check-expression search unit; and an output device for displaying or storing the output answer.

2. The question answering system according to claim 1, wherein the check-expression generation unit is configured to execute a syntactic and semantic analysis process to analyze the input question sentence.

3. A question answering system comprising:
a processor;
an input device for receiving an input question sentence;
a question-sentence analysis unit controlled by the processor which is configured to extract a keyword to be applied to a search process from the input question sentence;
a search unit controlled by the processor which is configured to execute the search process with using the extracted keyword;
an answer-candidate extraction unit controlled by the processor which is configured to extract answer candidates for the input question sentence based on a search result of the search unit;
a check-expression generation unit controlled by the processor which is configured to analyze a structure of the input question sentence to generate a check expression concatenating an analysis result of the check-expression generation unit and the answer candidates extracted by the answer-candidate extraction unit;
a check-expression search unit which is configured to execute a search process based on the check expression generated by the check-expression generation unit;
an answer-candidate correction unit controlled by the processor which is configured to select an output answer to the input question from among answer the candidates based on a search result of the check-expression search unit; and
an output device for displaying or storing the output answer,
wherein the check-expression generation unit is configured to
execute a syntactic and semantic analysis process of the input question sentence to generate f-structure representing semantic information of the question sentence as a matrix structure of attribute-value,
generate f-structure, which corresponds to each answer candidate and concatenates each answer candidate extracted by the answer-candidate extraction unit with the generated f-structure or simplified f-structure resulting from simplifying the generated f-structure, and
generates the check expression based on the generated f-structure corresponding to each answer candidate.

4. The question answering system according to claim 1, wherein the answer-candidate correction unit is configured to
calculate a number of hits corresponding to each answer candidate from the search result of the check-expression search unit and
select an answer candidate having the number of hits greater than a predetermined threshold value as the output answer to the input question.

5. The question answering system according to claim 1, wherein the answer-candidate extraction unit is configured to generate an answer candidate list ranking the answer candidates for the input question sentence in accordance with a predetermined score calculation algorithm.

6. A question answering system comprising:
a processor;
an input device for receiving an input question sentence;
a question-sentence analysis unit controlled by the processor which is configured to extract a keyword to be applied to a search process from the input question sentence;
a search unit controlled by the processor which is configured to execute the search process using the extracted keyword;
an answer-candidate extraction unit controlled by the processor which is configured to extract answer candidates for the input question sentence based on a search result of the search unit;
a check-expression generation unit controlled by the processor which is configured to analyze a structure of the input question sentence to generate a check expression concatenating an analysis result of the check-expression generation unit and the answer candidates extracted by the answer-candidate extraction unit;
a check-expression search unit controlled by the processor which is configured to execute a search process based on the check expression generated by the check-expression generation unit;
an answer-candidate correction unit controlled by the processor which is configured to select an output answer to the input question from among answer the candidates based on a search result of the check-expression search unit; and
an output device for displaying or storing the output answer,
wherein the check-expression generation unit is configured to
execute a syntactic and semantic analysis process of the input question sentence,
generate an f-structure representing semantic information of the sentence as a matrix structure of attribute-value as the analysis result, and
generate an f-structure, which corresponds to each answer candidate and concatenate each answer candidate extracted by the answer-candidate extraction unit with the generated f-structure or simplified f-structure resulting from simplifying the generated f-structure; and
the check-expression generation unit being configured to execute the search process based on the f-structure corresponding to each answer candidate.

7. A data search method comprising:
extracting a keyword to be applied to a first search process from an input question sentence;
executing the first search process with using the extracted keyword;
extracting answer candidates for the input question sentence based on a search result of the first search process;
executing an analysis of the input question sentence, an analysis result including at least detection of a subject of the input question sentence, to generate a check expression in which (i) at least the subject of the input question sentence of the analysis result and (ii) each of the answer candidates are concatenated;
executing a second search process based on the generated check expression; and
selecting an output answer to the input question from among the answer candidates based on a search result of the second search process.

8. The data search method according to claim 7, wherein the executing of the analysis of the input question sentence comprises:
executing a syntactic and semantic analysis process of the input question sentence.

9. The data search method according to claim 7, wherein the selecting of the output answer comprises:
   calculating number of hits corresponding to each answer candidate from the search result of the second search process; and
   selecting an answer candidate having the number of hits greater than a predetermined threshold value as the output answer to the input question.

10. The data search method according to claim 7, wherein the extracting of the answer candidates comprises generating an answer candidate list ranking the answer candidates for the input question sentence in accordance with a predetermined score calculation algorithm.

11. A data search method comprising:
   extracting a keyword to be applied to a first search process from an input question sentence;
   executing the first search process with using the extracted keyword;
   extracting answer candidates for the input question sentence based on a search result of the first search process;
   executing an analysis of the input question sentence to generate a check expression concatenating an analysis result and the extracted answer candidates;
   executing a second search process based on the generated check expression; and
   selecting an output answer to the input question from among the answer candidates based on a search result of the second search process;
   wherein the executing of the analysis of the input question sentence comprises:
      executing a syntactic and semantic analysis process of the input question sentence to generates f-structure representing semantic information of the question sentence as a matrix structure of attribute-value,
      generating f-structure, which corresponds to each answer candidate and concatenates each answer candidate extracted by the answer-candidate extraction unit with the generated f-structure or simplified f-structure resulting from simplifying the generated f-structure, and
      generating the check expression based on the generated f-structure corresponding to each answer candidate.

12. A data search method comprising:
   extracting a keyword to be applied to a first search process from an input question sentence;
   executing the first search process with using the extracted keyword;
   extracting answer candidates for the input question sentence based on a search result of the first search process;
   executing an analysis of the input question sentence to generate a check expression concatenating an analysis result and the extracted answer candidates;
   executing a second search process based on the generated check expression; and
   selecting an output answer to the input question from among the answer candidates based on a search result of the second search process;
   wherein the executing of the analysis of the input question sentence comprises:
      executing a syntactic and semantic analysis process of the input question sentence,
      generating f-structure representing semantic information of the sentence as a matrix structure of attribute-value as the analysis result,
      generating f-structure, which corresponds to each answer candidate and concatenates each extracted answer with the generated f-structure or simplified f-structure resulting from simplifying the generated f-structure, and
      executing the second search process based on the f-structure corresponding to each answer candidate.

13. A computer program stored in a computer readable medium, the computer program causing a computer to execute a data search process comprising:
   extracting a keyword to be applied to a first search process from an input question sentence;
   executing the first search process with using the extracted keyword;
   extracting answer candidates for the input question sentence based on a search result of the first search process;
   executing an analysis of the input question sentence, an analysis result including at least detection of a subject of the input question sentence, to generate a check expression in which (i) at least the subject of the input question sentence of the analysis result and (ii) each of the answer candidates are concatenated;
   executing a second search process based on the generated check expression; and
   selecting an output answer to the input question from among the answer candidates based on a search result of the second search process.

* * * * *